March 31, 1959
E. R. THOMAS
2,879,663
MOBILE GAS DETECTING APPARATUS
Filed Nov. 25, 1955
3 Sheets-Sheet 1
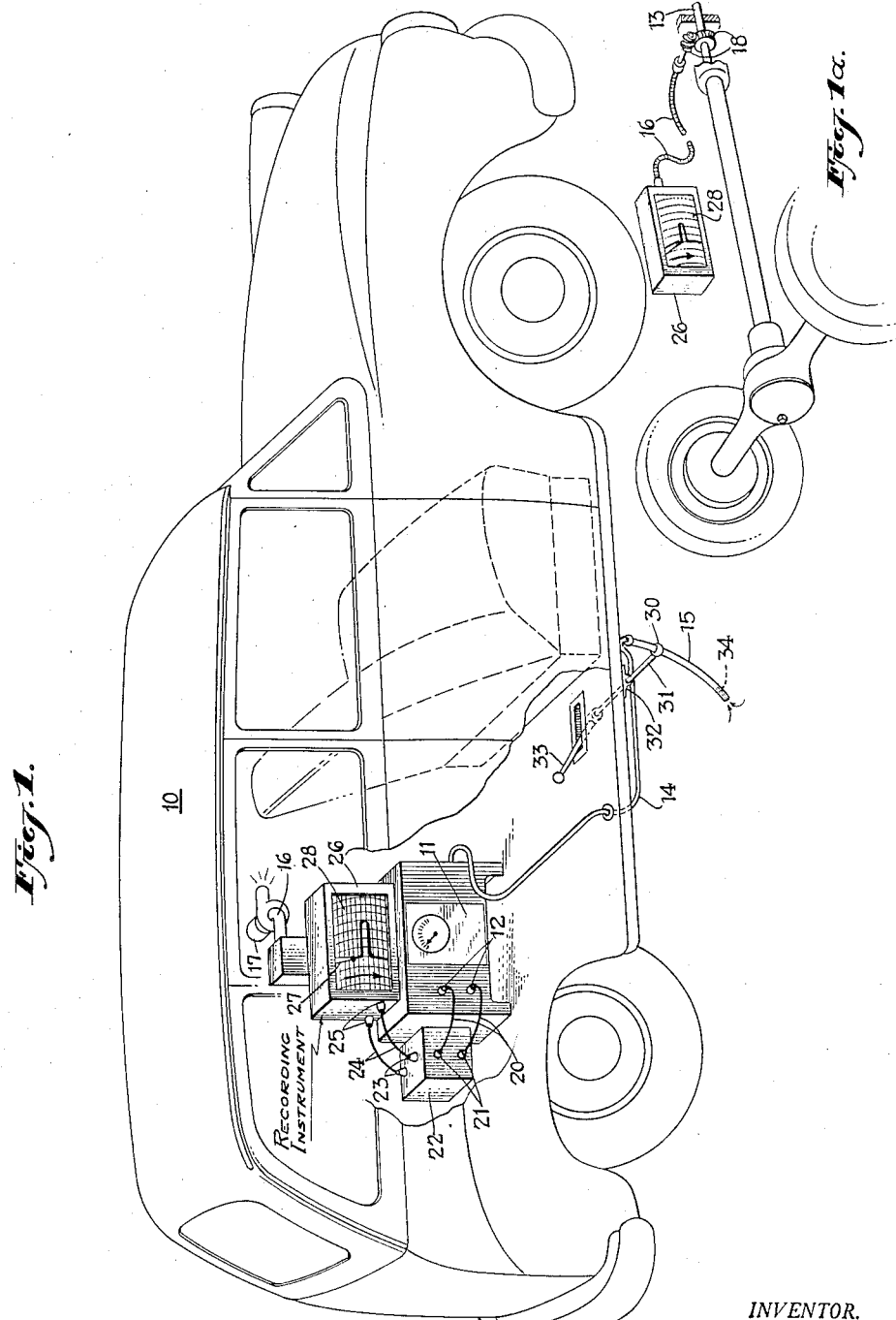
INVENTOR.
EARL R. THOMAS.
BY
Ward, Neal, Haselton Orme & McElhannon
ATTORNEYS.

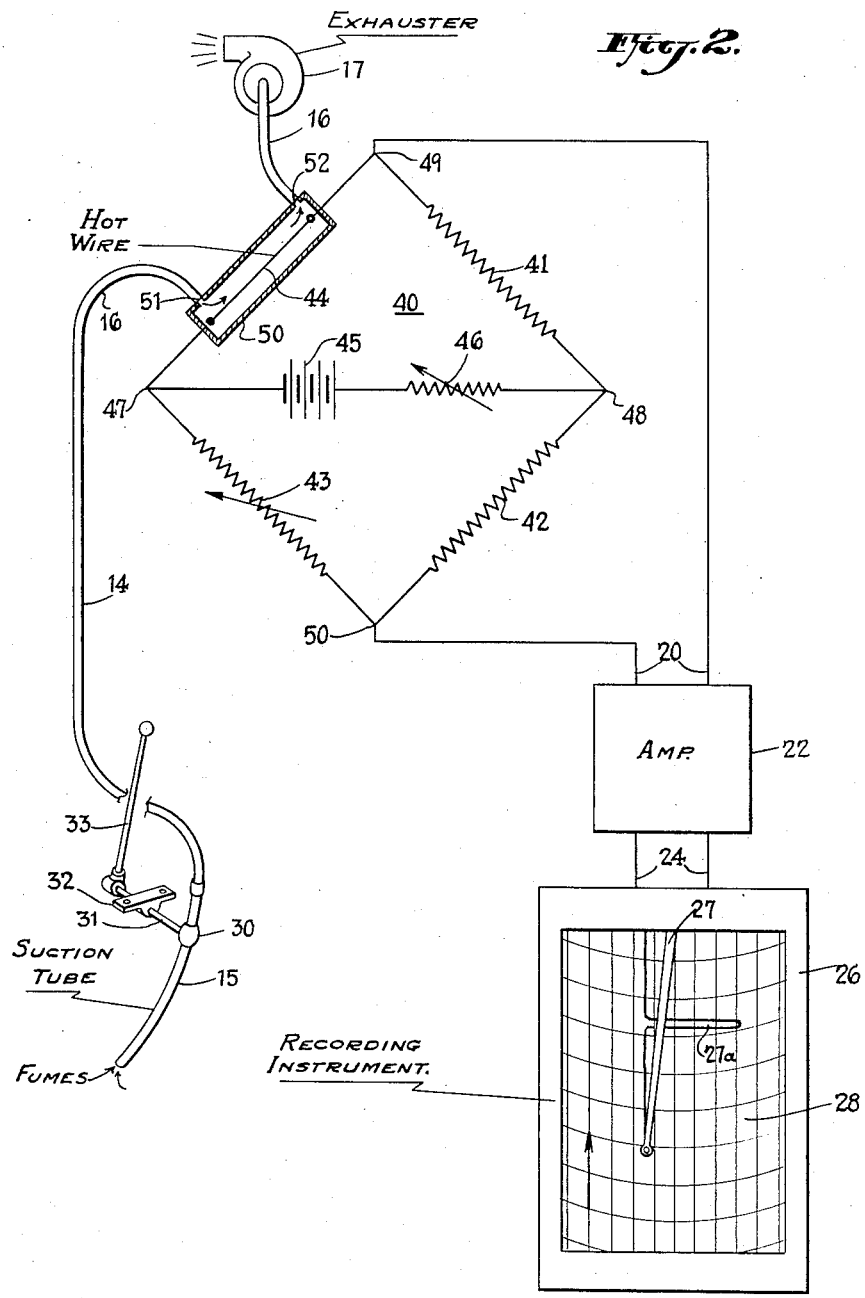

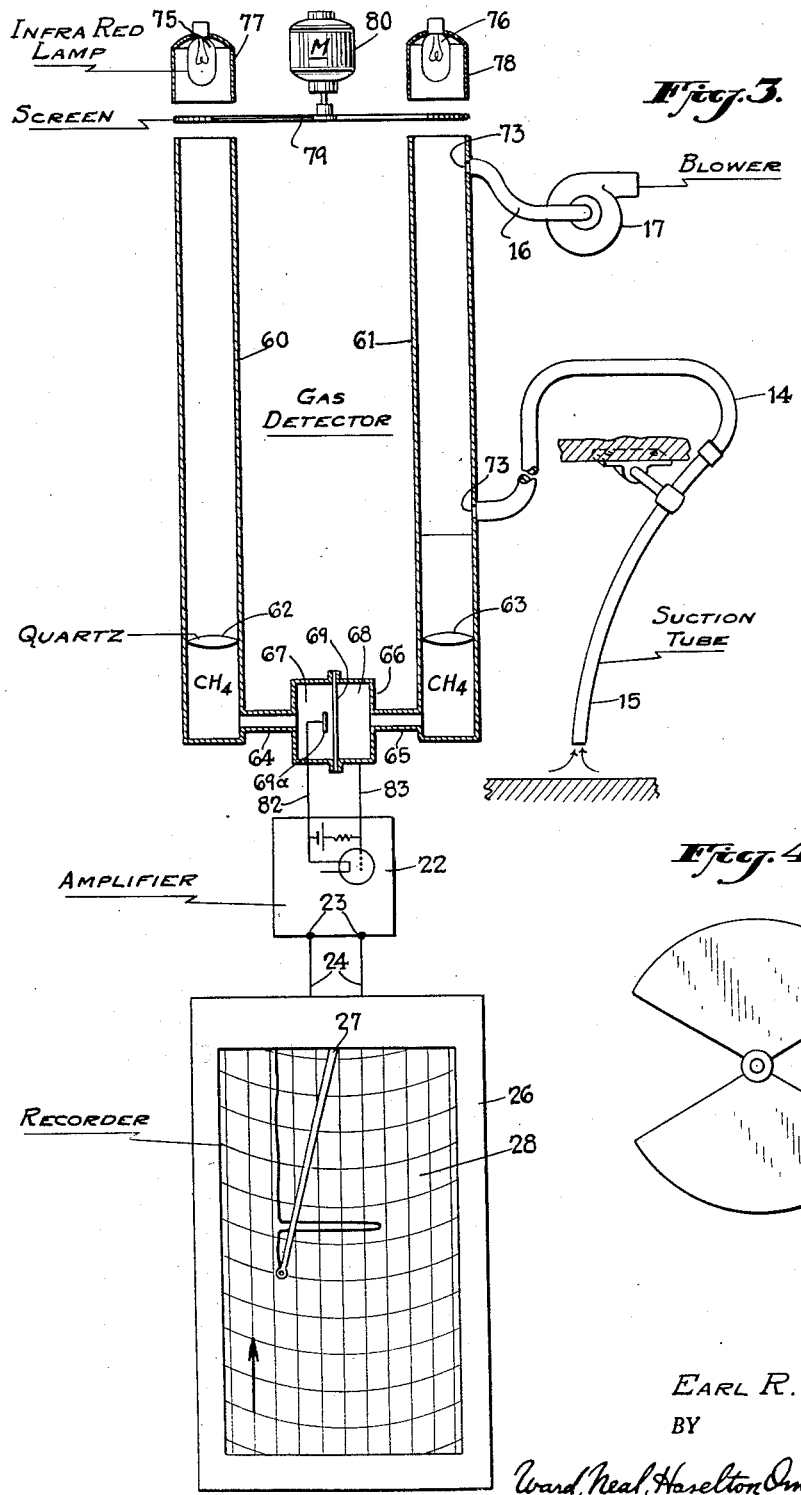

United States Patent Office 2,879,663
Patented Mar. 31, 1959

2,879,663

MOBILE GAS DETECTING APPARATUS

Earl R. Thomas, Englewood, N.J., assignor to Consolidated Edison Company of New York, Inc., New York, N.Y., a corporation of New York Application November 25, 1955, Serial No. 549,005

1 Claim. (Cl. 73—26)

This invention pertains to a mobile apparatus of operating the same, for making rapid over-ground surveys of the concentration and locus of a given gas or combination of gases, according to which the gas or gases are automatically detected as to concentration and continuously recorded graphically on a chart in both magnitude and location, the latter as a function of the distance traversed by said mobile unit along a selected survey route.

While many devices have heretofore been developed for making spot checks to determine the concentration of a given gas or gases present in the atmosphere, none has been provided, insofar as I am aware, for automatically detecting and recording such information in the form of a continuous survey in which a graphic record of the concentration of such gas or gases is shown as a function of location or distance traversed along a preselected route.

The present invention provides an apparatus of this character according to the preferred embodiment of which the gas detecting and recording equipment is mounted in an automobile or equivalent vehicle. A suction tube provided with a motor driven blower extends from the gas detecting equipment to a level near the ground for continuously sucking up atmospheric and other gases present in the air, at a uniform rate, as the vehicle moves along the route to be surveyed. For detecting combustible gases the gas detecting unit may be of the hot wire detecting type, or for detecting specific gases, such as methane, carbon monoxide, etc., may be of the infra-red, comparative absorption type. The gases thus continuously drawn up through the suction tube are supplied to the gas detecting unit which measures the concentration of the gas or gases to be detected and translates the same into an electrical voltage of proportioned magnitude. This voltage is amplified in an amplifying unit and fed thence to an electrically actuated stylus of a chart recorder arranged for movement of the chart past the stylus in a direction substantially at right angles to the direction of stylus deflection.

The movement of the chart past the stylus is so coordinated with the movement of the vehicle along the survey route, that travel of the chart past the stylus is proportional to the travel of the vehicle along the survey route. This coordination may be effected in any of various ways as by coupling the drive for the chart recorder to one of the wheels or drive shaft of the vehicle by means of a flexible shaft and gearing, or by means of a selsyn motor drive, or even by independently driving the recorder and vehicle at uniform rates during the survey and appropriately correlating the same.

The result is that as the vehicle moves along the survey route from any given starting point, the recording chart moves a proportional distance past the recording stylus, which latter meantime continuously records by deflections in a direction traverse to the chart movement, the concentration of the gas or gases to be detected occurring at each point along the survey route. A rapid and uninterrupted survey may thus be carried out to provide in the form of a permanent record on the chart, the exact distance along th esurvey route at which each locus of gas leakage or excessive gas concentration occurs as well as the extent or magnitude thereof.

The invention is of particular value and especial application in rapidly locating the points of leakage of combustible gases or hydrocarbons being transported in underground pipelines, by movement of the mobile detecting unit of the invention along the pipeline route. It has heretofore been the conventional practice in locating such leaks, to make insertion test holes through the ground along the pipeline route, and then test with a gas detector samples of air in these test holes. This obviously expensive and time-consuming procedure is entirely eliminated by the present invention, which in addition involves no damage to the paving along the pipeline route. Thus the invention permits of detecting and locating of such leakages without resort to point-by-point examination of test holes. We have found in this connection that where leakage occurs through such a pipeline, sufficient of the escaping gases seep through the earth in the vicinity of the leak, to provide easy detection with the apparatus of our invention. Even on solidly paved areas there always occur sufficient surface breaks in the form of cracks, fissures, manholes, etc., that detection of the gas leaks is easily effected with the present invention.

The invention also finds especial application in locating and determining the boundary areas of natural gas and oil deposits, gases escaping from which almost invariably seep up through the earth's surface. With the mobile gas detection unit of my invention, a gas or oil bearing region may be rapidly surveyed in criss-cross fashion and the location and boundaries of the well thus rapidly determined.

Having thus described the invention in general terms, reference will now be had for a more detailed description to the accompanying drawings wherein:

Fig. 1 is a schematic view in perspective of a mobile gas detecting unit according to the invention in which the detecting equipment is mounted in a motor vehicle.

Fig. 1a is a fragmentary detail in perspective illustrating an arrangement for driving the chart recorder from the drive shaft of the motor car of Fig. 1.

Fig. 2 is a diagrammatic view of a hot wire type of gas detecting apparatus according to the invention adapted for mounting in the mobile unit of Fig. 1; while Fig. 3 is a corresponding diagrammatic view of an infra-red, comparative absorption type of gas detecting equipment corresponding to that shown in perspective in Fig. 1.

Fig. 4 is a plan view of a rotatable chopper screen employed in the Fig. 3 equipment for producing a pulsating or alternating current form of detection.

Referring to Fig. 1 there is shown a mobile unit comprising a motor car 10, having mounted therein a gas or vapor detector instrument 11, as described below, which produces an electrical output voltage at 12, proportional to the concentration of the gas to be detected which is present in an air sample fed to the instrument 11. The air sample to be analyzed is supplied to the detector 11, through a section of flexible tubing 14, one end 15 of which projects below the vehicle 10 to a level a few inches above the ground, and the opposite end of which is connected to the gas detecting unit 11 in a manner explained below.

The electrical output 12 of the gas detector is connected, as at 20, to the input 21, of an electrical amplifier 22, the output 23 of which is in turn connected, as at 24, to the input 25 of an electrical chart recorder 26. The recorder 26 is of conventional construction and includes the usual electrically actuated stylus 27 adapted to traverse a moving chart 28, the stylus being deflectable in a direction substantially at right angles to the direction of movement of the chart, the latter as shown by the arrow thereon.

As above stated the chart 28 is driven at a speed proportional to the speed of the car 10 along the route to be surveyed. This may be effected most simply by independently driving the chart 28 and the car 10 at uniform speeds and appropriately relating the two. Or the recorder drive may, as illustrated in Fig. 1a, be directly gearer to the drive shaft 13 of the vehicle through a flexible shaft 16 and gearing arrangement 18 similar to that conventionally employed for actuating the speedometer of the car 10.

The terminal portion 15 of the flexible tubing 14 extends through an eyelet 30 of a shaft 31 rotatably mounted in a bracket 32 secured to the underside of the car body as shown. To the inner end of the shaft is secured a lever 33, rotation of which raises and lowers the terminal portion 15 of the tubing as desired. Portion 15 of the tubing preferably contains a filter 34 to prevent dust particles, etc., from being sucked through the tubing into the gas detecting equipment.

Referring now to Fig. 2, there is shown a detector for combustible gases of the hot wire detector type as incorporated in the apparatus of the invention. The detector 40 comprises a Wheatstone bridge having resistance balancing arms 41, 42, of fixed ratio, a balancing arm 43 of adjustable resistance, and a balancing arm 44 composed of wire the resistance of which varies appreciably with temperature.

The bridge is energized from a battery 45 or other suitable power source connected in series with a load resistance 46, between points 47, 48 of the bridge, comprising one conjugate arm, while the opposite conjugate arm extending between points 49, 50 of the bridge, is connected over conductors 20 to the input of the amplifier 22 above referred to. The thermally responsive arm 44 of the bridge is enclosed in a housing 50 having inlet and outlet ports 51, 52, to one of which the flexible tubing section 14 is connected, and to the other of which is connected a tubing section 16 containing a suction blower 17.

In operation sufficient current is supplied from source 45 to the thermally responsive wire 44 to heat it to the combustion temperature of combustible gases drawn in, admixed with air, through the tubing section 14, 15 and fed therein through housing 50 and out through tubing 16 and blower 17. The bridge as thus arranged is balanced with uncontaminated air passing through housing 50, by appropraite adjustment of the balancing arm 43. Thus during the subsequent survey when combustible gases are present in the air sample being drawn through the housing 50 they will be ignited by the hot wire 44 and will thus further raise the temperature of wire 44 in proportion to the combustible gas concentration. This will correspondingly unbalance the bridge to apply a voltage to the input of amplifier 22 in proportion to the combustible gas concentration in the air sample. The amplified output from the amplifier will thus correspondingly deflect the stylus 27 of the recorder 26 to record as at 27a, on the moving chart 28, deflections corresponding to the combustible gas concentration, present in the air samples, from instant to instant during the survey.

Fig. 3 shows an infra-red ray, comparative absorption type of gas detector incorporated in the apparatus of the invention for detecting a specific type of gas in a sample to be analyzed such, for example, as methane, constituting the principal constituent of natural gas. This apparatus comprises essentially a pair of identical vertically disposed tubes 60, 61 having mounted in each near the base, and the same distance therefrom in each tube, a quartz lens 62, 63, which seals off the lower portion of the tube. If the gas to be detected is methane, the sealed off lower portion of each tube is filled with methane to a preselected pressure. From the base of each tube 60, 61, a pipe connection 64, 65, extends to an air tight metal housing 66 which is partitioned into two chambers 67, 68 of equal volume, by means of a flexible metal diaphragm 69, as shown. Stationarily mounted adjacent the diaphragm 69, and in slightly spaced parallel relation thereto, in a metal plate 69a, which in conjunction with the diaphragm forms an electrical condenser of variable capacity as explained below. The upper portion of the tube 61 is provided near the base and top thereof with inlet and outlet ports 72, 73, connected respectively, to the flexible tubings 14 and 16, the latter containing the suction blower 17. Mounted, respectively, above the upper ends of tubes 60, 61, are a pair of infra-red lamps 75, 76, disposed within reflecting housings 77, 78, for directing the infra-red rays down through the tubes. Interposed between the lamps 75, 76, and the tubes 60, 61, is a light chopper 79, of the configuration shown in plan view in Fig. 4, this chopper being rotatively mounted on the shaft of a motor 80 for rotation thereby.

In the operation of the Fig. 3 modification, assume for the moment and for purposes of simplifying the explanation, that the light chopper is not rotating and is so disposed as not to interfere with the transmission of rays from the infra-red lamps 75, 76 down through the tubes 60, 61. Let us further assume for the moment that the sample of air being drawn through the upper section of tube 61 from the suction tube inlet 15 and thence out through the blower 17, is of the same analysis as the air in the upper portion of the opposite tube 60. In this case the infra-red rays transmitted through tubes 60 and 61 from lamps 75, 76, respectively, will be equally absorbed by the gases in these two tubes and thus will heat up to the same extent the methane gas in the sealed off lower portions of these tubes. The gas pressure on one side of the flexible diaphragm 69 will thus be the same as that on the other side and hence there will be no flexing of the diaphragm in one direction or the other.

On the other hand, if the air being drawn through the upper portion of tube 61 contains an appreciable proportion of methane, the infra-red rays passing down through tube 61 will be absorbed by the methane gas fraction in the upper portion of this tube to a greater extent than are the infra-red rays which pass down through the uncontaminated air in the upper portion of tube 60. As a result, the methane gas in the lower sealed off portion of tube 60 will be heated to a greater extent than the methane gas in the sealed off lower portion of tube 61. As a consequence, the gas pressure on the left side of the flexible diaphragm 69 will be greater than on the right side and accordingly the diaphragm will flex to the right by an amount which is proportional to the fraction of methane gas which is present in the air specimen passing through the upper portion of tube 61. This flexing of diaphragm 69 away from the fixed plate 69a will in turn vary the capacity therebetween by an amount proportional to the flexing. The fixed plate 69a and diaphragm 69 are connected over leads 82, 83, to the input of amplifier 22, which if it be of the direct current amplifying type will provide at its output terminals 23, an amplified output voltage which is proportional to the extent of flexing of diaphragm 69, and will thus correspondingly deflect stylus 27 of the chart recorder 28 connected over leads 24 to the amplifier output.

The function of the chopper 79 is merely to permit the use of an alternating current type of amplifier for the amplifier 22. Thus under the conditions above explained, if the chopper is rotated by the motor 80 at, for example, about 10 cycles per second, it will cause the diaphragm 69 to return from its flexed position to its median position, during each interval that the chopper blocks off the infra-red ray entry into the tubes 60, 61, and thereupon to permit the diaphragm to flex during light transmission intervals in proportion to the fraction of methane gas being analyzed in the upper portion of tube 61. Accordingly by connecting leads 82, 83, to the input of an alternating current amplifier, the amplified output thereof will be an alternating voltage of a magnitude proportional to the gas specimen being analyzed.

The sensitivity of the apparatus of the invention has been found to be such as to detect the gas or gases being tested for, when present in the air sample being analyzed as low as 30 parts in one million by volume.

What is claimed is:

A mobile unit for detecting and charting the locus of leaks of a preselected gas through the surface of the earth comprising: a vehicle movable along said surface and mounting means including a circular member rotatable in engagement with said surface for measuring distance traversed, gas detection means mounted on said vehicle including a tube having one end positionable at a level adjacent said surface, suction means for drawing air through said tube, analyzing means for measuring the concentration of said preselected gas in the air drawn through said tube, and recording means responsive to said analyzing means, said recording means including a chart and a stylus for recording said preselected gas concentrations on said chart, means responsive to rotation of said circular member for moving said chart past said stylus a distance proportional to the distance traversed by said circular member, whereby a detected gas leak is recorded on said chart at a distance therealong which is proportional to the distance traversed by said vehicle along said surface.

References Cited in the file of this patent

UNITED STATES PATENTS

| | | |
|---|---|---|
| 1,264,495 | Dunbar | Apr. 30, 1918 |
| 2,149,440 | Jackson | Mar. 7, 1939 |
| 2,289,687 | Stuart | July 14, 1942 |
| 2,528,956 | Hayward | Nov. 7, 1950 |
| 2,598,096 | Bailly | May 27, 1952 |